United States Patent
Zinoviev et al.

(10) Patent No.: US 9,829,628 B2
(45) Date of Patent: *Nov. 28, 2017

(54) STRUCTURE FOR OPTICAL WAVEGUIDE AND CONTACT WIRE INTERSECTION

(71) Applicant: Medlumics S.L., Tres Cantos—Madrid (ES)

(72) Inventors: Kirill Zinoviev, Madrid (ES); José Luis Rubio Guivernau, Madrid (ES)

(73) Assignee: Medlumics S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,663

(22) Filed: Mar. 3, 2017

(65) Prior Publication Data

US 2017/0176676 A1    Jun. 22, 2017

Related U.S. Application Data

(63) Continuation of application No. 14/584,592, filed on Dec. 29, 2014, now Pat. No. 9,588,291.

(60) Provisional application No. 61/922,297, filed on Dec. 31, 2013.

(51) Int. Cl.
  *G02B 6/12* (2006.01)
  *G02B 6/122* (2006.01)
  *G02B 6/136* (2006.01)

(52) U.S. Cl.
  CPC ............. *G02B 6/122* (2013.01); *G02B 6/136* (2013.01); *G02B 2006/12097* (2013.01); *G02B 2006/12135* (2013.01)

(58) Field of Classification Search
  None
  See application file for complete search history.

(56) References Cited

U.S. PATENT DOCUMENTS

| | | | |
|---|---|---|---|
| 5,179,567 A | 1/1993 | Uomi et al. | |
| 6,584,240 B2 | 6/2003 | Doi et al. | |
| 8,664,688 B2 | 3/2014 | Kamikawa et al. | |
| 9,217,827 B2 | 12/2015 | Jones et al. | |
| 9,588,291 B2 * | 3/2017 | Zinoviev | G02B 6/122 |
| 2004/0136414 A1 | 7/2004 | Matsumoto et al. | |
| 2004/0232521 A1 | 11/2004 | Colombet | |

(Continued)

FOREIGN PATENT DOCUMENTS

GB   2426073 A   11/2006

OTHER PUBLICATIONS

International Search Report directed to related International Patent Application No. PCT/EP2014/079428, dated Apr. 2, 2015; 3 pages.

(Continued)

*Primary Examiner* — Tina Wong
(74) *Attorney, Agent, or Firm* — Sterne, Kessler, Goldstein & Fox P.L.L.C.

(57) ABSTRACT

A device and a method for manufacturing the device are presented. The device includes a ridge, a peninsula formation, and a conductive trace. The ridge is defined within a semiconducting material. The peninsula formation is also defined within the semiconducting material and is adjacent to the ridge such that a gap exists between an end face of the peninsula formation and a side wall of the ridge. The conductive trace bridges across the gap such that the conductive trace runs over a top surface of the peninsula and a top surface of the ridge.

17 Claims, 5 Drawing Sheets

(56) References Cited

U.S. PATENT DOCUMENTS

2008/0304528 A1   12/2008  Yamamoto et al.
2012/0314725 A1   12/2012  Nakanishi et al.
2015/0185415 A1    7/2015  Zinoviev et al.

OTHER PUBLICATIONS

Written Opinion directed to related International Patent Application No. PCT/EP2014/079428, dated Apr. 2, 2015; 5 pages.

* cited by examiner ously grown silicon dioxide. Many active integrated optical systems have been based on silicon. The advantages of silicon integrated optical devices include the potential use of standard silicon integrated electronic circuit manufacturing technology and the integration of optical and electronic circuits on one silicon device. For the effective use of silicon integrated optics, it is considered important to produce both a low-loss waveguide structure and an electrically controllable modulating element. For this purpose, waveguides and electrical contact wires are fabricated on the same chip. The layout may require the waveguides and wires to cross each other in order to effectively use the room on chip, or to contact any active elements located on top of the waveguide.

BRIEF SUMMARY

In the embodiments presented herein, a device and method for manufacturing a device are presented to provide an improved layout for a contact wire and an associated optical waveguide.

In an embodiment, a device is presented that includes a ridge, a peninsula formation, and a conductive trace. The ridge is defined within a semiconducting material. The peninsula formation is also defined within the semiconducting material and is adjacent to the ridge such that a gap exists between an end face of the peninsula formation and a side wall of the ridge. The conductive trace bridges across the gap such that the conductive trace runs over a top surface of the peninsula and a top surface of the ridge.

STRUCTURE FOR OPTICAL WAVEGUIDE AND CONTACT WIRE INTERSECTION

CROSS REFERENCE TO RELATED APPLICATIONS

This application is a continuation of U.S. application Ser. No. 14/584,592, filed Dec. 29, 2014, which claims the benefit of U.S. provisional Application No. 61/922,297, filed Dec. 31, 2013, the disclosures of which are each incorporated by reference herein in their entireties.

BACKGROUND

Field

Embodiments of the invention relate to designs of, and methods of manufacturing, a waveguide structure with a patterned contact wire.

Background

Integrated optical circuits (IOC), analogous to integrated electronic circuits, comprise optical components formed on a substrate. A commonly used optical component is an integrated waveguide. The waveguides are used to guide light between various other components on the chip. The waveguides may be either strip or rib type and are formed by etching trenches in a structural layer of light guiding material. The trenches create a step difference in the refractive index, which provides light confinement and assures light propagation within the waveguide. Depending on the application, the waveguides may be of different thicknesses and the rib or strip height might be on the order of several microns thick. The application of integrated optics is most common in fiber optic communication, though many other applications exist. Common optical functions for which integrated optics are utilized include directional switching, phase modulation and intensity modulation.

Waveguides are typically covered by a cladding layer which, in the case of silicon waveguides, may be thermally An example method of fabricating a device is presented. The method includes etching a ridge and a peninsula formation in a semiconducting material, such that the peninsula formation is adjacent to the ridge and a gap exists between an end face of the peninsula formation and a side wall of the ridge. The method also includes depositing a conductive trace such that the conductive trace bridges across the gap and runs over a top surface of the peninsula and a top surface of the ridge.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Figure 1A:
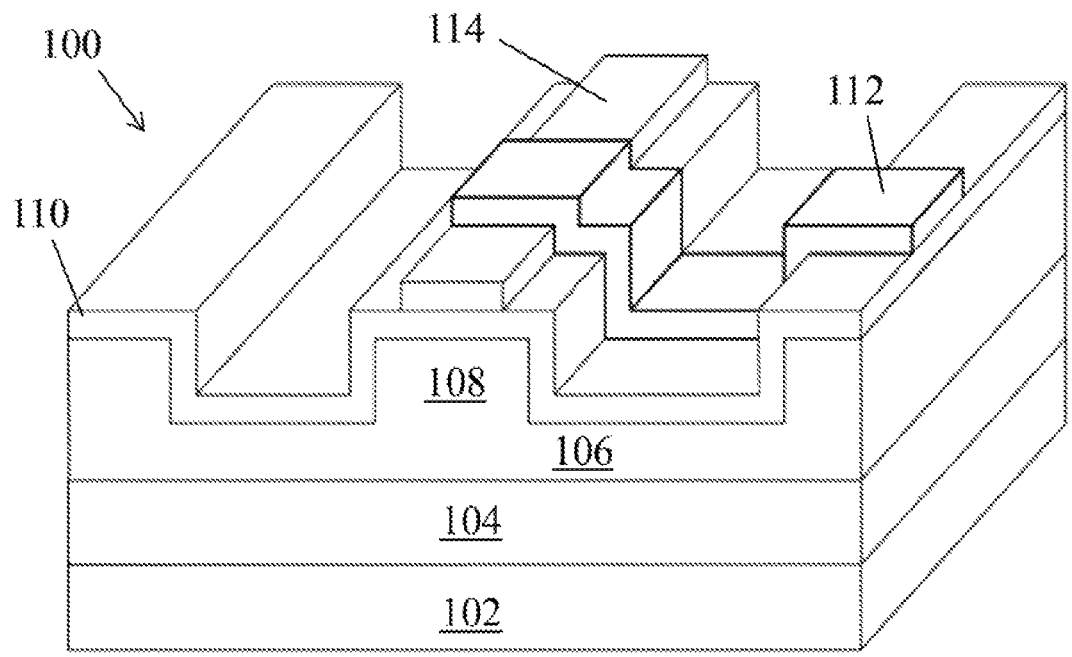
FIGS. 1A-1B illustrate portions of an optical integrated circuit.

FIG. 1A illustrates an example of a portion of an optical integrated circuit 100. FIG. 1A provides an ideal scenario where a contact wire 112 is patterned over a sidewall of a ridge 108 and makes contact to an active element 114 on a top surface of ridge 108.

Various material layers are illustrated within which optical integrated circuit 100 is defined. Optical integrated circuit 100 includes a substrate 102, a buffer layer 104 over substrate 102, and an active layer 106 over buffer layer 104. Substrate 102 and active layer 106 may be substantially the same material. For example, substrate 102 and active layer 106 may bath be silicon. Buffer layer 104 may be a material having a low electrical conductivity and/or having a lower index of refraction than the material of active layer 106. In the example where active layer 106 is silicon, buffer layer 104 may be silicon dioxide. Ridge 108 is defined within active layer 106 via an etching process, such as reactive ion etching or wet chemical etching. Other materials for active layer 106 may include indium phosphide, gallium arsenide, or gallium nitride.

After defining ridge 108 within active layer 106, a cladding layer 110 may be disposed over the surface of optical integrated circuit 100. Cladding layer 110 may be thermally grown or deposited using chemical vapor deposition techniques. For example, when active layer 106 is silicon, cladding layer 110 may be thermally grown silicon dioxide. Other materials may be deposited as well. Cladding layer 110 is typically chosen to be a material having a lower index of refraction than the material of active layer 106.

Optical integrated circuit 100 includes conductive trace 112, which is patterned to make contact with an active element 114 on a top surface of ridge 108. For example, ridge 108 may be a waveguide designed to confine and guide a beam of radiation while active element 114 may be a heater used to apply heat to ridge 108 and change its optical properties. Conductive trace 112 may be a metal such as gold, copper, or aluminum, or conductive trace may be an electrically conductive polymer. Conductive trace 112 may be formed via any known deposition technique such as sputtering, evaporation, or a lift-off process.

Figure 1B:
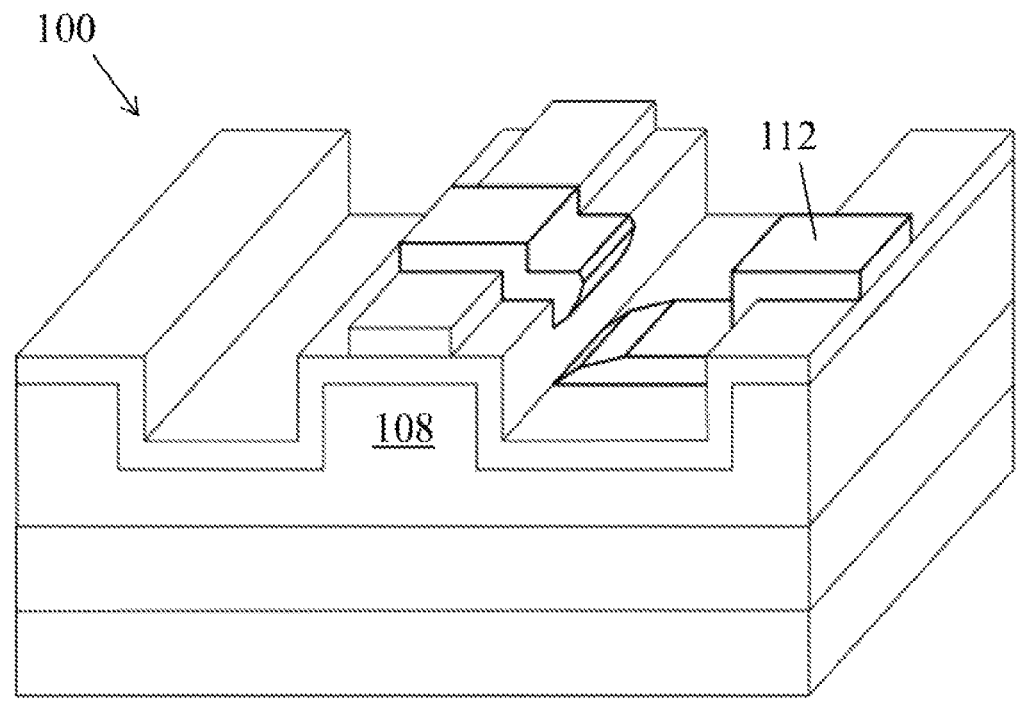

As illustrated in FIG. 1A, conductive trace 112 runs up a sidewall of ridge 108 to make contact with active element 114. However, in practice, such a design often fails due to poor coverage of conductive trace 112 on the sidewall. FIG. 1B illustrates a common discontinuity of conductive trace 112 on the sidewall of ridge 108. The sidewall discontinuity may occur for a number of reasons. Conductive trace 112 is typically very thin (e.g., on the order of hundreds of nanometers), and the deposition method of such a thin layer commonly provides poor coverage along vertical structures. Photoresist, which is commonly used during the patterning process of conductive traces, also provides poor coverage, or sometimes cannot be adequately cleared, around vertical features such as the sidewall of ridge 108.

One option for solving the sidewall discontinuity problem is to simply provide a bridge defined in active layer 106 and connected to ridge 108, such that a conductive trace can run along the top of the bridge and reach the top surface of ridge 108. Although this solution may remove the need to pattern the conductive trace up as sidewall, the bridge connected to ridge 108 causes light leakage when ridge 108 is used as an optical waveguide. Other problems such as back-reflections caused by the intersection areas of the bridge with the waveguide ridge may also be detrimental in certain applications, such as Optical Coherence Tomography (OCT).

Figure 2:
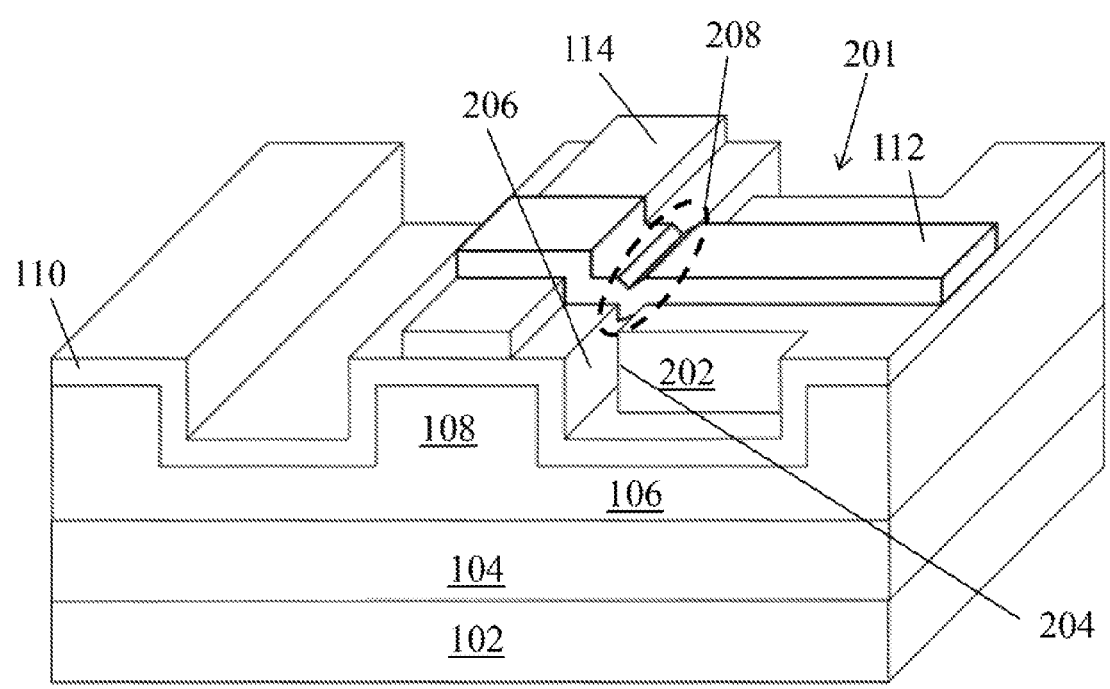
FIG. 2 illustrates a portion of an optical integrated circuit, according to an embodiment.

In an embodiment, a device design is presented that allows for a conductive trace to make contact with a top surface of a ridge, while maintaining the confinement of light within the ridge. Note that the term "ridge" is meant to be construed broadly and is not limited to a ridge waveguide. FIG. 2 illustrates a portion of an optical integrated circuit 200 having substantially the same substrate 102, buffer layer 104, and active layer 106 as described previously. Likewise, ridge 108 is defined within active layer 106. According to an embodiment, a peninsula formation 202 is also defined within active layer 106. Peninsula formation 202 may fill a portion of a trench 201 next to ridge 108 as illustrated in FIG. 2. In other examples, there is no defined trench, and active layer 106 is substantially planar except for ridge 108.

Peninsula formation 202 may be adjacent to ridge 108. In one example, peninsula formation 202 is angled such that an end face 204 of peninsula formation 202 faces a sidewall 206 of ridge 108 in a substantially orthogonal manner. A gap exists between end face 204 and sidewall 206. The gap allows for light to remain confined within ridge 108, when ridge 108 acts as an optical waveguide. The width of the gap is designed to be small enough to allow for conductive trace 112 to suspend over the gap as an unsupported bridge, as illustrated in region 208. For example, a thickness of the conductive trace may be between 200 nm and 1 μm while the gap may be between 100 nm and 500 nm wide. In an embodiment, the gap width may be defined as around half of the thickness of conductive trace 112. The width of the gap is large enough to prevent light from leaking out of ridge 108, but small enough that conductive trace 112 can be suspended across the gap without breakage. The width of the gap may be further defined based on a thickness of cladding layer 110 as described later with regards to FIG. 3C.

By bridging across the gap, conductive layer 112 runs across a top surface of peninsula formation 202 and runs over a top surface of ridge 108. In one example, conductive layer 112 makes contact with active element 114 disposed on the top surface of ridge 108, such as a heating element.

In an embodiment, cladding 110 covers ridge 108, including sidewall 206, but does not cover any part of peninsula formation 202. In another embodiment, cladding 110 covers ridge 108, including sidewall 206, as well as at least a portion of peninsula formation 202, including end face 204.

FIGS. 3A-3D illustrate a fabrication process flow, according to an embodiment. Note that there are a variety of techniques that could be used in each fabrication step to produce the illustrated result. As such, these figures are not meant to be limiting with regards to relative dimensions shown or geometry. They are provided as an example to convey the concept of the invention.

Figure 3A:
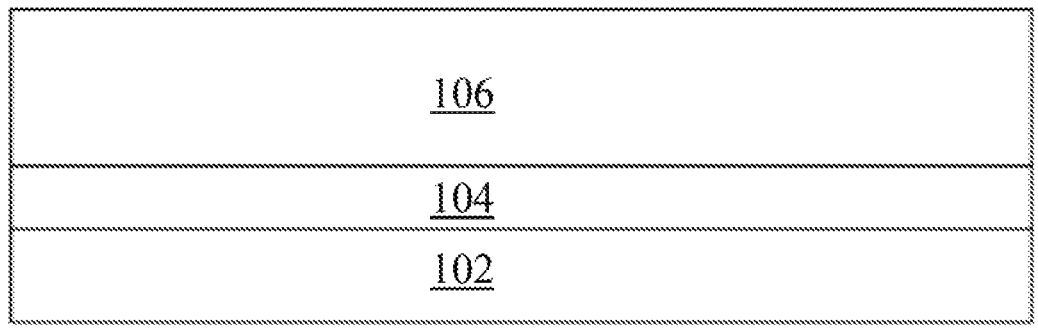
FIGS. 3A-3D illustrate a fabrication process of a device, according to an embodiment.

FIG. 3A illustrates substrate 102, buffer layer 104, and active layer 106 before any process steps have been performed on device 300. The illustrated layers may represent the layers of a silicon-on-insulator (SOI) wafer. Other layer materials may include various tertiary or quaternary semi-conducting compounds with optical properties suitable for use with optical integrated circuits. Such materials commonly have a direct band gap and/or are transparent to infrared light.

Figure 3B:
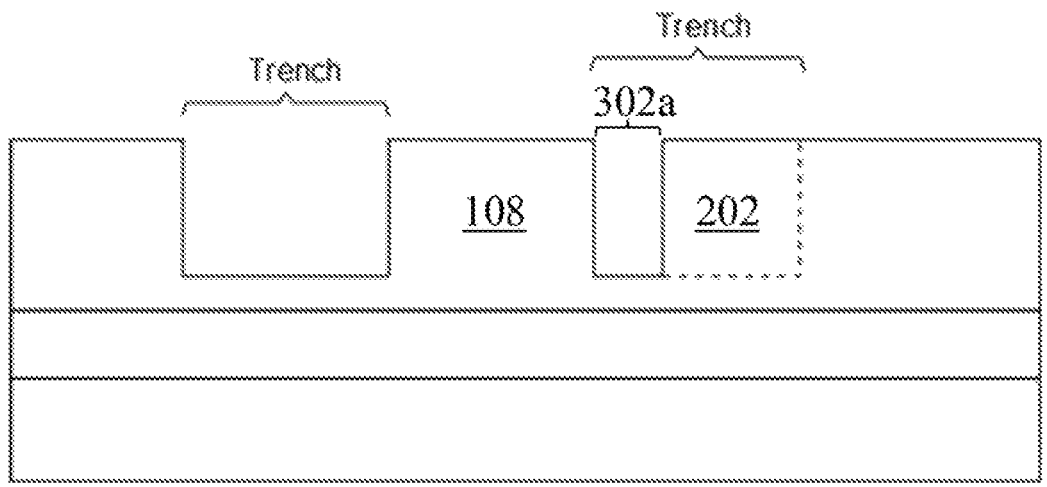

FIG. 3B illustrates an etching process that defines ridge 108 and peninsula formation 202, according to an embodiment. Both ridge 108 and peninsula formation 202 may have the same thickness and may be formed via the same etching process. In one example, ridge 108 and peninsula formation 202 are between 1 μm and 5 μm thick. Also illustrated is a gap 302a between end face 204 of peninsula formation 202 and sidewall 206 of ridge 108.

Figure 3C:
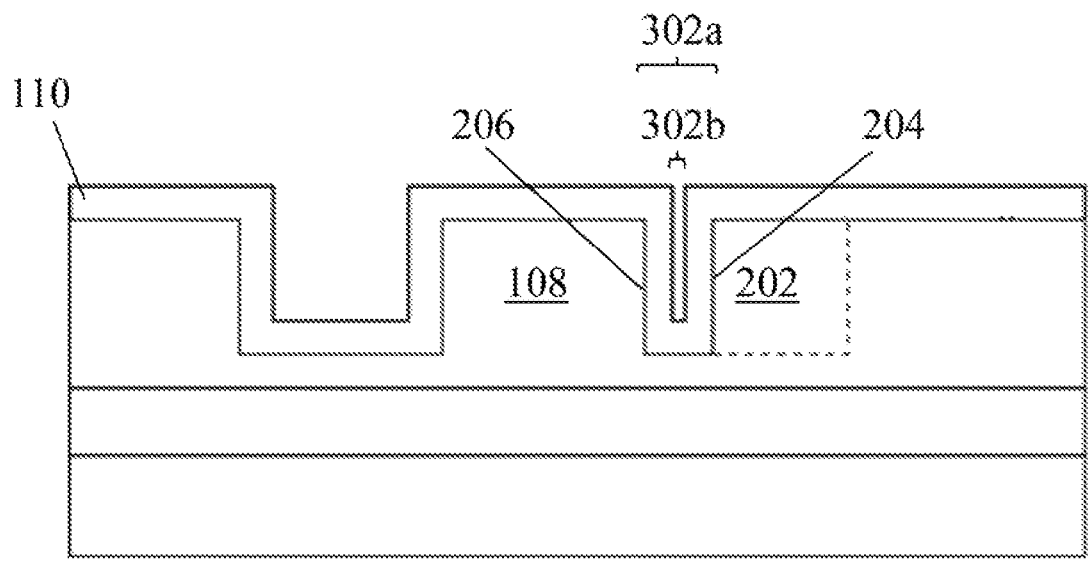

FIG. 3C illustrates cladding layer 110 being disposed over the surface of device 300. Cladding layer 300 may be thermally grown, such as the growth of silicon dioxide from silicon. In an embodiment, cladding layer 110 is also disposed over end face 204 of peninsula formation 202 and sidewall 206 of ridge 108. As such, a thickness of cladding layer 110 contributes to forming a gap 302b with a smaller width than the original gap 302a. Gap 302b may have a width between 100 nm and 500 nm. Smaller widths than 100 nm may be possible as well based on the thickness of cladding layer 110. Additional layers may be present as well over or beneath cladding layer 110. Any number of layers may be used without deviating from the scope or spirit of the invention.

In another embodiment, cladding layer 110 may be grown such that it substantially fills all of gap 302a. In this case, there is no gap between end face 204 of peninsula formation 202 and sidewall 206 of ridge 108. The cladding material substantially filling the space between end face 204 of peninsula formation 202 and sidewall 206 of ridge 108 would still maintain confinement of the light within ridge 108 due to the lower index of refraction of cladding layer 110, according to an embodiment.

Figure 3D:
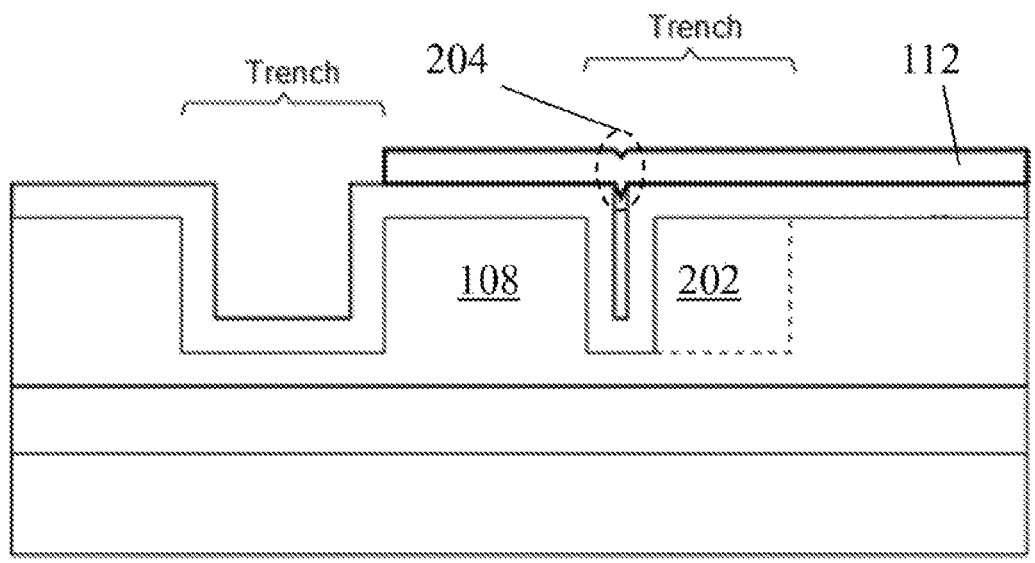

FIG. 3D illustrates the addition of conductive trace 112, according to an embodiment. Conductive trace 112 bridges over gap 302b in region 204 and runs over a top surface of peninsula formation 202 and a top surface of ridge 108. In the embodiment where cladding layer 110 substantially fills the area between peninsula formation 202 and ridge 108, conductive trace 112 would lay on the cladding that fills the gap.

In an embodiment, conductive trace 112 may make contact with an active element (not shown), such as a heating element, disposed over the top surface of ridge 108. The active element may be disposed directly on the top surface of ridge 108, or on cladding layer 110 over the top surface of ridge 108. Other examples of active elements include transistors, optical switches, phase modulators and frequency modulators.

Figure 4:
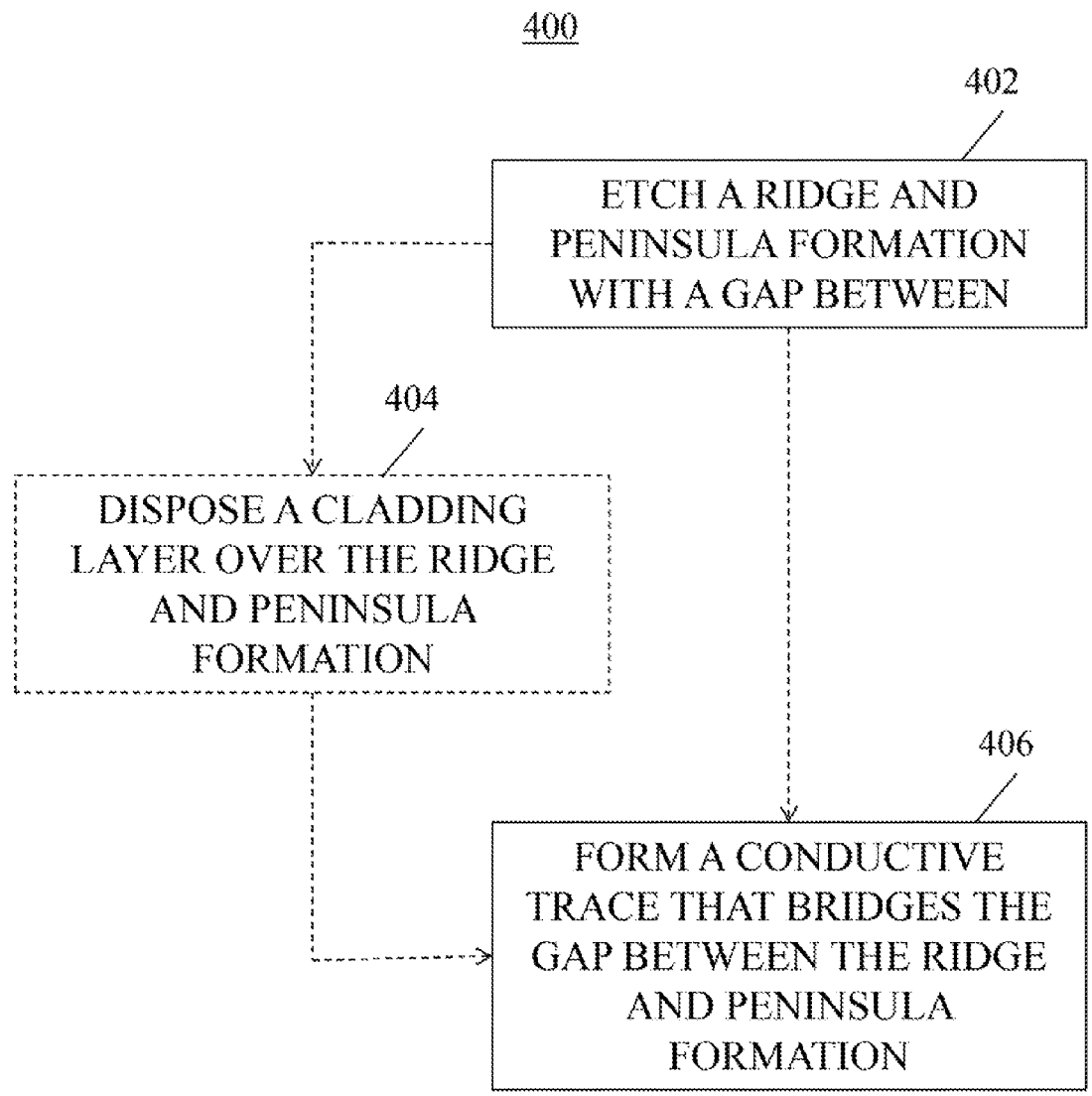
FIG. 4 illustrates an example method.

FIG. 4 illustrates an example method 400. Method 400 provides a fabrication process for manufacturing a portion of an optical integrated circuit, according to an embodiment.

At block 402, a ridge and peninsula formation are etched in a semiconducting material. The peninsula formation is designed such that it is angled substantially orthogonal to the ridge, according to an embodiment. The etching of the ridge and peninsula forms a gap between an end face of the peninsula formation and a side wall of the ridge, according to an embodiment.

At block 404, a cladding layer is optionally disposed. According to an embodiment, the cladding layer is disposed over at least the end face of the peninsula formation and the side wall of the ridge. The cladding layer may be thermally grown. According to an embodiment, the addition of the cladding layer defines a width of the gap based on a thickness of the cladding layer between the end face of the peninsula formation and the side wall of the ridge. When adding the cladding layer, the width of the gap may be made smaller than the smallest feature size that conventional lithography systems can provide. In one example, the cladding layer is grown such that it substantially fills the area between the end face of the peninsula formation and the sidewall of the ridge.

At block 406, a conductive trace is formed over the ridge and peninsula formation, such that the conductive trace bridges the gap between the end face of the peninsula formation and the side wall of the ridge. The conductive trace may be deposited using any of the techniques known to one skilled in the art, such as sputtering or evaporation. The conductive trace may also be formed via a metal lift-off process. The conductive trace may have a thickness around double the width of the gap.

Additional steps may be considered as part of method 400. For example, an active element, such as a heating element, may be disposed on the cladding layer over the top surface of the ridge. The conductive trace may bridge the gap and make contact with the heating element. According to an embodiment, electrical current provided to the heating element through the conductive trace may cause the heating element to produce heat, thus changing the optical properties of the ridge. The change in optical properties may modulate a beam of radiation confined within the ridge when the ridge is used as an optical waveguide.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A device, comprising:
a ridge defined within a semiconducting material;
a cladding layer disposed over a top surface and a side wall of the ridge;
an active element disposed on the cladding layer over the top surface of the ridge;
a peninsula formation defined within the semiconducting material, and adjacent to the ridge such that a gap exists between an end face of the peninsula formation and the side wall of the ridge; and
a conductive trace suspended across the gap such that the conductive trace runs over a top surface of the peninsula formation and the top surface of the ridge, and provides electrical contact with the active element.

2. The device of claim 1, wherein the gap is between 100 nm and 500 nm wide.

3. The device of claim 2, wherein the thickness of the conductive trace is between 200 nm and 1 μm.

4. The device of claim 1, wherein the ridge is an optical waveguide and the semiconducting material includes at least one of silicon, indium phosphide, and gallium arsenide.

5. The device of claim 1, wherein the cladding layer is further disposed over the top surface and end face of the peninsula formation.

6. The device of claim 5, wherein a width of the gap is defined based on a thickness of the cladding layer between the side wall of the ridge and the end face of the peninsula formation.

7. The device of claim 1, wherein the active element comprises a transistor.

8. The device of claim 1, wherein a thickness of the ridge is between 1 μm and 5 μm.

9. The device of claim 1, wherein the peninsula formation is angled substantially orthogonal to the ridge.

10. A method of fabricating a device, comprising:
   etching a ridge and a peninsula formation in a semiconducting material, such that the peninsula formation is adjacent to the ridge and a gap exists between an end face of the peninsula formation and a side wall of the ridge;
   disposing a cladding layer over a top surface and the side wall of the ridge;
   disposing an active element on the cladding layer over the top surface of the ridge;
   forming a conductive trace such that the conductive trace suspends across the gap and runs over a top surface of the peninsula and the top surface of the ridge, and provides electrical contact with the active element.

11. The method of claim 10, wherein the forming comprises depositing the conductive trace using sputtering.

12. The method of claim 10, wherein the forming comprises depositing the conductive trace using evaporated metal.

13. The method of claim 10, further comprising disposing the cladding layer over the top surface and end face of the peninsula formation.

14. The method of claim 13, wherein the cladding layer is thermally grown.

15. The method of claim 13, wherein a width of the gap is defined based on a thickness of the cladding layer between the side wall of the ridge and the end face of the peninsula formation.

16. The method of claim 10, further comprising providing an electrical current to the active element to modulate a beam of radiation passing through the ridge.

17. The method of claim 10, wherein the etching comprises etching such that the peninsula formation is angled substantially orthogonal to the ridge.

* * * * *